Jan. 3, 1933.   H. C. DRAKE   1,893,074
FLAW DETECTOR
Filed June 18, 1929
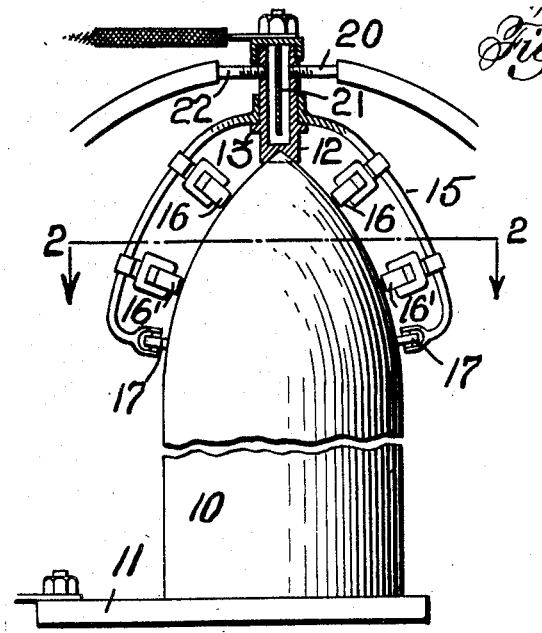
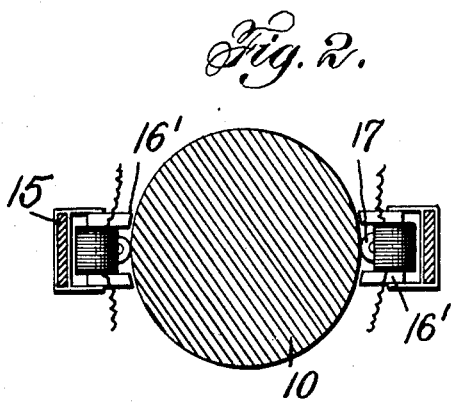
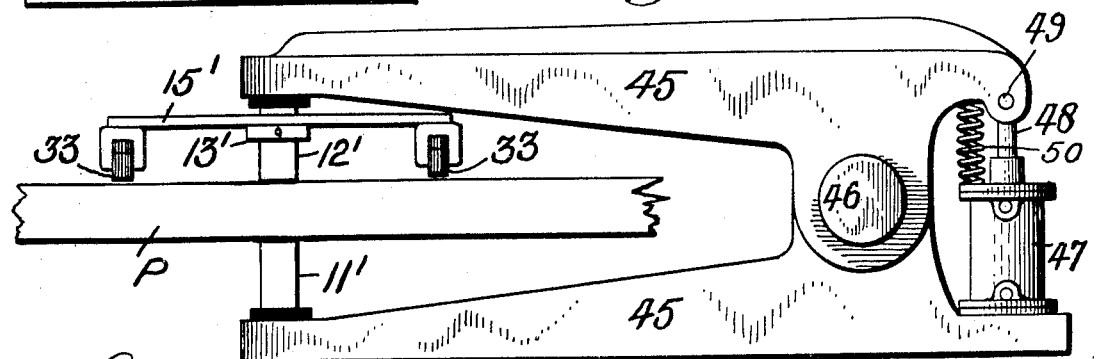
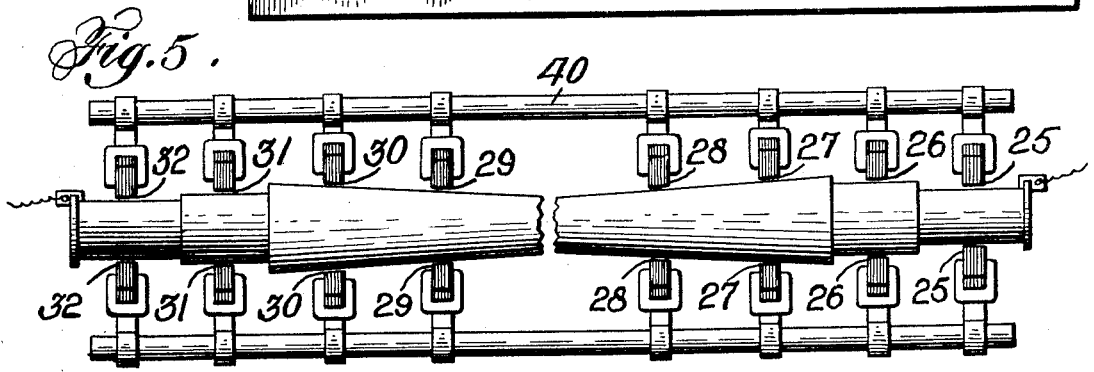
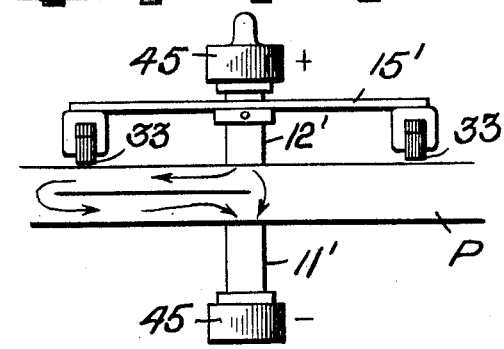
INVENTOR
HARCOURT C. DRAKE.
BY
Herbert H. Thompson
his ATTORNEY.

Patented Jan. 3, 1933

1,893,074

UNITED STATES PATENT OFFICE

HARCOURT C. DRAKE, OF HEMPSTEAD, NEW YORK, ASSIGNOR, BY MESNE ASSIGNMENTS, TO SPERRY PRODUCTS, INC., OF BROOKLYN, NEW YORK, A CORPORATION OF NEW YORK

FLAW DETECTOR

Application filed June 18, 1929. Serial No. 371,891.

This invention relates to means for detecting flaws and imperfections in materials capable of conducting electricity. The invention is particularly adapted for objects, such as shells, shafts, and the like, circular in cross section but it can also be applied to objects, such as plates, having a flat surface. The principle embodied in this invention consists in establishing along the axis of an object an electric field by passing therethrough a heavy current, the axis of the current being coincident with the axis of the object. If no flaws appear in the object the path of the current is undisturbed and the flux distribution is symmetrical with respect to the axis of the object and the axis of the current. If a detector means, responsive to flux variations, were to be moved around a circle having the said axis as its center, no variation in flux would be detected, since the flux distribution is the same at any point on the periphery of such circle. If, however, flaws are present in the object, the flux distribution with respect to the axis of the object will be displaced, and if a detecting means is applied to various points on the circumference of a circle having the said axis as its center, there will be indicated variations in flux which will induce current in the detector means.

It is the principal object of my invention, therefore, to provide for relative rotation between a detector means and an object with the center of rotation coincident with the axis of the object.

It is a further object of my invention to provide detector means to be utilized in the above apparatus whereby a multiplication of any variation in flux due to the presence of a flaw will be obtained.

It is a further object of this invention to provide cooling means for one or both of the electrodes whereby the heavy current is introduced into the object to be tested to prevent raising the temperature of said object at the points of contact, which would in some cases have a deteriorating effect upon the object.

Other objects and advantages of this invention will become apparent in the following detailed description thereof.

In the accompanying drawing:

Fig. 1 is a front elevation, partly sectioned vertically, of one form of my invention applied to the testing of shells.

Fig. 2 is a section taken substantially on line 2—2 of Fig. 1.

Fig. 3 is a side elevation of another form of my invention, designed especially for the testing of flat plates.

Fig. 4 is a front elevation of the Fig. 3 form of the invention.

Fig. 5 is an elevation of still another form of my invention designed especially for the testing of shafts of varying cross section.

Referring to the Figs. 1 and 2 form of my invention, I have shown a shell 10 forming, in this case, the object to be tested, held between two electrodes 11 and 12 at opposite ends thereof whereby a heavy current may be passed therethrough, the axis of the current coinciding with the central axis of the shell. In accordance with the principles of the invention hereinbefore described, the flux distribution with respect to said axis of the current and axis of the object will be symmetrical about said axis provided no flaws are present. If, however, a flaw is present, the flux distribution is displaced with respect to the axis of the shell to yield a greater flux distribution to one side than to the other. For detecting any variations in flux, I may mount a carriage 15 for rotation about the axis of said shell. Said carriage 15 may be provided with a plurality of coils 16—16' closely adjacent the said shell and provided with guide rollers 17 adapted to engage the shell and maintain the coils 16—16' in predetermined relation to the periphery of the shell. I have mounted the coils in pairs, the coils of each pair being positioned at opposite ends of a diameter of the shell. Thus coils 16 are at opposite ends of a relatively narrow diameter near the upper end of the shell, while the coils 16' are at the ends of a relatively larger diameter of said shell. It will be understood that these coils may be multiplied as desired or as is found necessary to detect variations in the flux distribution throughout the portion of the shell to be tested.

While I may employ single coils 16 or 16' at various points along the axis of the shell, such single coils will detect variations in the supply of current and will give an indication of an apparent flaw where no flaw exists. By providing two coils at the same point on the axis of the shell, said coils being oppositely connected, they will respond oppositely to variations in current supply to cancel out such variations. At the same time should any flaw appear in the shell, the said coils will both detect the said flaw and the induced currents in the said coils will be additive to give a stronger indication on the indicating means.

Any suitable indicating means may be connected to the said detector coils to indicate induced currents and if desired, the said induced currents may first be amplified by any suitable amplifying means before it is received by an indicator or recorder, as in my copending application Serial No. 277,240, filed May 12, 1928.

Preferably I mount the said carriage 15 upon one of the electrodes, here shown as electrode 12, which may have formed thereon a flange 13 for this purpose, the carriage 15 being rotatable on said flange.

The operation of this form of my invention will be readily apparent from the theory of the invention hereinbefore set forth. The carriage 15 and the shell are relatively rotated around the axis of the shell which is also the axis of support of said carriage, and since coils 16—16' are at a constant radius from the axis of the shell, no differential E. M. F.'s will be induced therein if the flux distribution is symmetrical with respect to the said axis of the shell. The presence of a flaw, however, will displace the flux distribution so that there is more to one side than the other and this variable flux distribution will cause the coils 16—16' in their relative movement with respect to the periphery of the shell to induce a differential E. M. F. which will be transmitted to the indicator or recorder. If desired, some suitable form of constant driving means, such as a constant speed motor, may be geared to the rotating element which may be carriage 15, or the shell, or both, to rotate the same automatically at a constant rate.

Since the tips of shells are very finely tempered and temperature changes may prove detrimental to the proper conditioning of the said tip, I provide means for cooling electrode 12 so that the current passing through the shell will not raise the temperature at said tip to a degree that will prove detrimental thereto. For this purpose the said electrode 12 may be hollow and a supply of cooling fluid may be furnished by an inlet 20, the fluid being caused to flow downwardly adjacent the tip by means of a baffle 21, thence passing outwardly through an outlet 22. If desired, the same construction may be employed for cooling electrode 11.

The same principle of the invention is disclosed in the Fig. 5 form, which is merely an application to the testing of a different kind of object. In this case the object to be tested is a shaft having a variable contour. The shaft is supported about its axis, and at as many points along said axis as it is necessary to detect the flux distribution throughout its entire length, there are provided sets of coils 25 to 32 inclusive. Current is sent through the shaft by electrodes suitably attached thereto. The said coils are suitably mounted in a frame 40, the said frame being suitably mounted for rotation about the axis of the shaft to be tested. The operation of the device is exactly as hereinbefore described with respect to the Figs. 1 and 2 form of the invention. If desired, frame 40 may be held fixed and the shaft may be rotated with respect to the coils, or both may be rotated. This will in no way change the result as the same relative rotation between the coils and the object to be tested will take place.

My invention is applicable not only to objects having a circular cross section, but also to flat plates. Thus, in Figs. 3 and 4, there is disclosed a form of the invention wherein flat plates may be tested by the same type of mechanism and by the same principle as the other forms of the invention hereinbefore described. A pair of electrodes 11'—12' may be connected to opposite sides of the plate P to be tested so that an axis of current is established. A pair of coils 33 mounted upon a carriage 15' may be carried upon a flange 13' for rotation about the axis of the electrodes. It will thus be seen that the detector coils 33, being at the same radius, will in the course of their rotation pick up any displacement of the flux distribution with respect to the axis established by the electrodes, caused by the presence of flaws. When a given area of plate has been tested, the said electrodes 11'—12' and the carriage 15' may be moved to another portion of the plate. To facilitate this operation, I cause the electrodes 11'—12' to be carried at the ends of jaws 45 pivoted at 46 and forming a pair of tongs. The opposite ends of jaws 45 extending beyond the pivot 46 may be inter-connected by means of a pump 47 having a piston 48, the said pump being connected to one of the jaws and the piston being pivoted at 49 to the other jaw. Means, such as a spring member 50, may be connected between the inner ends of the jaws or between one jaw and the pump 47 fixed to the other jaw, so as normally to maintain the outer ends of the jaws spaced apart to move the electrodes 11'—12' out of contact with plate P. In this position the device may be moved to any desired portion of plate P and when the device is in position for testing another portion of plate P, pump 47 may be operated either by compressed air or hydraulically or in any other suitable manner to force the piston-carrying rod 48 upwardly and move the electrodes into engagement with the plate against the action of spring 50.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device for indicating flaws in an object, means for passing a heavy current through said object, said means including electrodes connected to opposite ends of said object, detector means responsive to variations in flux distribution and carried by one of said electrodes adjacent said object, and means whereby said detector means and said object may be relatively rotated.

2. In a device for indicating flaws in an object, means for passing a heavy current through said object, said means including electrodes connected to opposite ends of said object, and detector means responsive to variations in flux distribution and rotatably mounted on one of said electrodes for rotation adjacent said object.

In testimony whereof I have affixed my signature.

HARCOURT C. DRAKE.